(12) United States Patent
Jun (10) Patent No.: US 10,296,245 B2
(45) Date of Patent: May 21, 2019

(54) MEMORY SYSTEM FOR REBUILDING DATA IN MEMORY BLOCKS AND OPERATING METHOD THEREOF

(71) Applicant: SK hynix Inc., Gyeonggi-do (KR)

(72) Inventor: JangHwan Jun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/597,805

(22) Filed: May 17, 2017

(65) Prior Publication Data

US 2018/0107412 A1    Apr. 19, 2018

(30) Foreign Application Priority Data

Oct. 14, 2016 (KR) .................. 10-2016-0133566

(51) Int. Cl.
*G06F 3/06* (2006.01)
*G06F 11/14* (2006.01)

(52) U.S. Cl.
CPC ............ *G06F 3/0619* (2013.01); *G06F 3/065* (2013.01); *G06F 3/0652* (2013.01); *G06F 3/0688* (2013.01); *G06F 11/14* (2013.01); *G06F 3/0656* (2013.01)

(58) Field of Classification Search
CPC ...... G06F 3/0619; G06F 3/065; G06F 3/0652; G06F 3/0656; G06F 3/0688; G06F 11/14

USPC .......................................... 711/103, 161, 162
See application file for complete search history.

(56) References Cited

U.S. PATENT DOCUMENTS

| 2013/0246716 | A1* | 9/2013 | Kato ....................... G06F 3/064 |
| | | | 711/148 |
| 2016/0124820 | A1* | 5/2016 | Lin ....................... G06F 3/0619 |
| | | | 714/6.12 |
| 2016/0141046 | A1* | 5/2016 | Khandelwal ....... G11C 16/3427 |
| | | | 365/185.02 |

FOREIGN PATENT DOCUMENTS

| KR | 1020140042430 | 4/2014 |
| KR | 1020150045747 | 4/2015 |
| KR | 1020150130638 | 11/2015 |

* cited by examiner

*Primary Examiner* — Shane D Woolwine
(74) *Attorney, Agent, or Firm* — IP & T Group LLP (57) ABSTRACT

A method of rebuild operation of a memory controller, the method includes: searching a reference page information stored in a first memory block when a power is restored after occurrence of a sudden power off; identifying a reference page of a second memory block and storing the reference page information of the reference page into the first memory block when the reference page information is determined not to be stored in the first memory block; and performing a rebuild operation to data stored in the second memory block based on the reference page information stored in the first memory block.

16 Claims, 9 Drawing Sheets

| PN | LPN | SEQ | | PN | 1st erased page info table |
|---|---|---|---|---|---|
| 0 | 11 | 100 | | 20 | 1st erased page info |
| 1 | 12 | 101 | | 21 | |
| 2 | 13 | 102 | | 22 | |
| 3 | 14 | 103 | | 23 | |
| 4 | 15 | 104 | | 24 | |
| 5 | 16 | 105 | ~520 | 25 | |
| 6 | DUMMY | | ~530 | 26 | |
| 7 | 16 | 105 | ~535 | 27 | |
| 8 | DUMMY | | ~531 | 28 | |
| 9 | DUMMY | | ~532 | 29 | |
| 10 | 16 | 105 | ~536 | 30 | |
| 11 | | | ~540 | 31 | |

MEMORY SYSTEM FOR REBUILDING DATA IN MEMORY BLOCKS AND OPERATING METHOD THEREOF

CROSS-REFERENCE TO RELATED APPLICATION

This U.S. non-provisional patent application claims priority under 35 U.S.C. § 119(a) to Korean Patent Application No. 10-2016-0133566 filed on Oct. 14, 2016 in the Korean Intellectual Property Office (KIPO), the disclosure of which is incorporated herein by reference in its entirety.

TECHNICAL FIELD

Exemplary embodiments of the present invention relate to a memory system which processes data to and from a memory device, and an operating method thereof.

DISCUSSION OF THE RELATED ART

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments are directed to a memory system capable of maximizing use efficiency in use of a memory device, and an operating method thereof.

In an exemplary embodiment of the present invention, an operation method of a controller for a memory system, the method may include: searching a reference page information stored in a first memory block when a power is restored after occurrence of a sudden power off; identifying a reference page in a second memory block, and storing the reference page information of the identified reference page into the first memory block when the reference page information is determined not to be stored in the first memory block as a result of the searching; and performing a rebuild operation to data stored in the second memory block based on the reference page information stored in the first memory block.

Preferably, the reference page may be a $1^{st}$ erased page of the second memory block.

Preferably, the performing of the rebuild operation may include: programming dummy data into a $1^{st}$ empty page next to the $1^{st}$ erased page in the second memory block; and copying data stored in a last written page previous to the $1^{st}$ erased page into a $2^{nd}$ empty page next to the $1^{st}$ empty page.

Preferably, the identifying of the reference page may be performed through a binary search.

Preferably, the reference page information may include address information of the $1^{st}$ erased page.

Preferably, the reference page may be a last written page of the second memory block.

Preferably, the performing of the rebuild operation may include: programming dummy data into a $1^{st}$ empty page next to the last written page in the second memory block; and copying data stored in the last written page into a $2^{nd}$ empty page next to the $1^{st}$ empty page.

Preferably, the identifying of the reference page may be performed through a binary search.

Preferably, the reference page information may include address information of the last written page.

In an exemplary embodiment of the present invention, a memory system may include: a memory device including a first memory block for storing a reference page information and a second memory block for storing data; and a controller suitable for performing a rebuild operation to data stored in the memory device, wherein the controller: searches the reference page information stored in the first memory block when a power is restored after occurrence of a sudden power off; identifies a reference page in the second memory block, and stores the reference page information of the identified reference page into the first memory block when the reference page information is determined not to be stored in the first memory block as a result of the searching; and performs a rebuild operation to data stored in the second memory block based on the reference page information stored in the first memory block.

Preferably, the reference page may be—a $1^{st}$ erased page of the second memory block.

Preferably, the controller may perform the rebuild operation by: programming dummy data into a $1^{st}$ empty page next to the $1^{st}$ erased page in the second memory block; and copying data stored in a last written page previous to the $1^{st}$ erased page into a $2^{nd}$ empty page next to the $1^{st}$ empty page.

Preferably, the controller may identify the reference page of the second memory block through a binary search.

Preferably, the reference page information may include address information of the $1^{st}$ erased page.

Preferably, the reference page may be a last written page of the second memory block.

Preferably, the controller may perform the rebuild operation by: programming dummy data into a $1^{st}$ empty page next to the last written page in the second memory block; and copying data stored in the last written page into a $2^{nd}$ empty page next to the $1^{st}$ empty page.

Preferably, the controller may identify the reference page of the second memory block through a binary search.

Preferably, the reference page information may include address information of the last written page.

In accordance with various embodiments of the present invention, data stored in memory cells of a semiconductor memory device may be precisely read.

BRIEF DESCRIPTION OF THE DRAWINGS

These and other features and advantages of the present invention will become apparent to those skilled in the art to which the present invention pertains from the following detailed description in reference to the accompanying drawings.

DETAILED DESCRIPTION

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Figure 1:
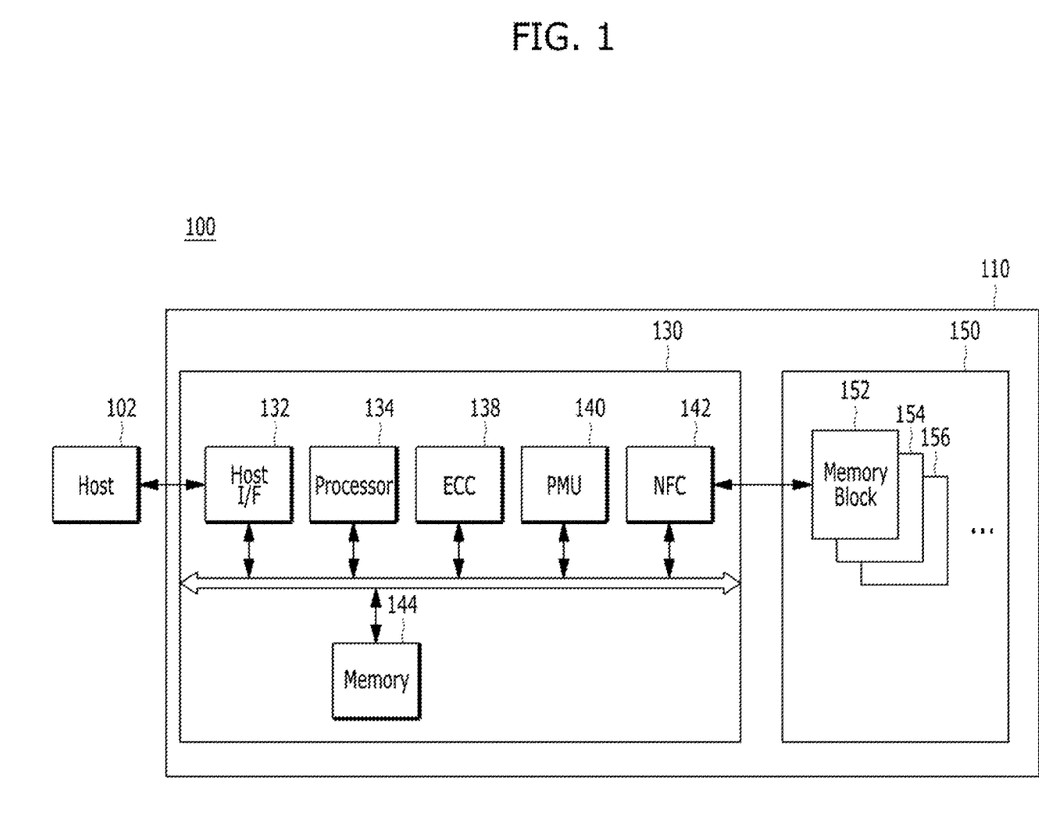
FIG. 1 is a block diagram illustrating a data processing system in accordance with an embodiment of the present invention.

FIG. 1 is a block diagram illustrating a data processing system 100 in accordance with an embodiment of the present invention.

Referring to FIG. 1, the data processing system 100 may include a host 102 and a memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a memory device controller such as a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The memory device controller 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory device controller 142 may be an NFC. The memory device controller 142 may generate a control signal for the memory device 150 and process data to be provided to the memory device 150 under the control of the processor 134. The memory device controller 142 may work as an interface (e.g., a NAND flash interface) for processing a command and data between the controller 130 and the memory device 150. Specifically, the memory device controller 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130, FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110.

Thus, the bad block management operation needs to be performed with more reliability.

Figure 2:
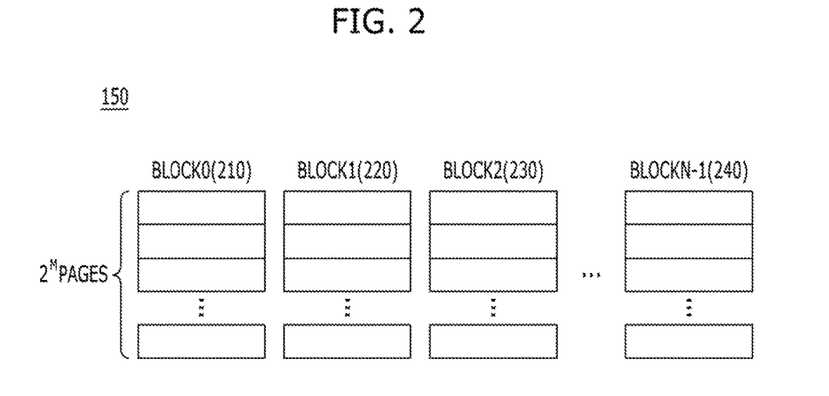
FIG. 2 is a schematic diagram illustrating an exemplary configuration of a memory device employed in the memory system of FIG. 1.

FIG. 2 is a schematic diagram illustrating the memory device 150.

Referring to FIG. 2, the memory device 150 may include a plurality of memory blocks 0 to N−1 and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, a multi-level cell (MLC) storing 2-bit data, a triple level cell (TLC) storing 3-bit data, a quadruple level cell (QLC) storing 4-bit level cell, a multiple level cell storing 5-or-more-bit data, and so forth.

Figure 3:
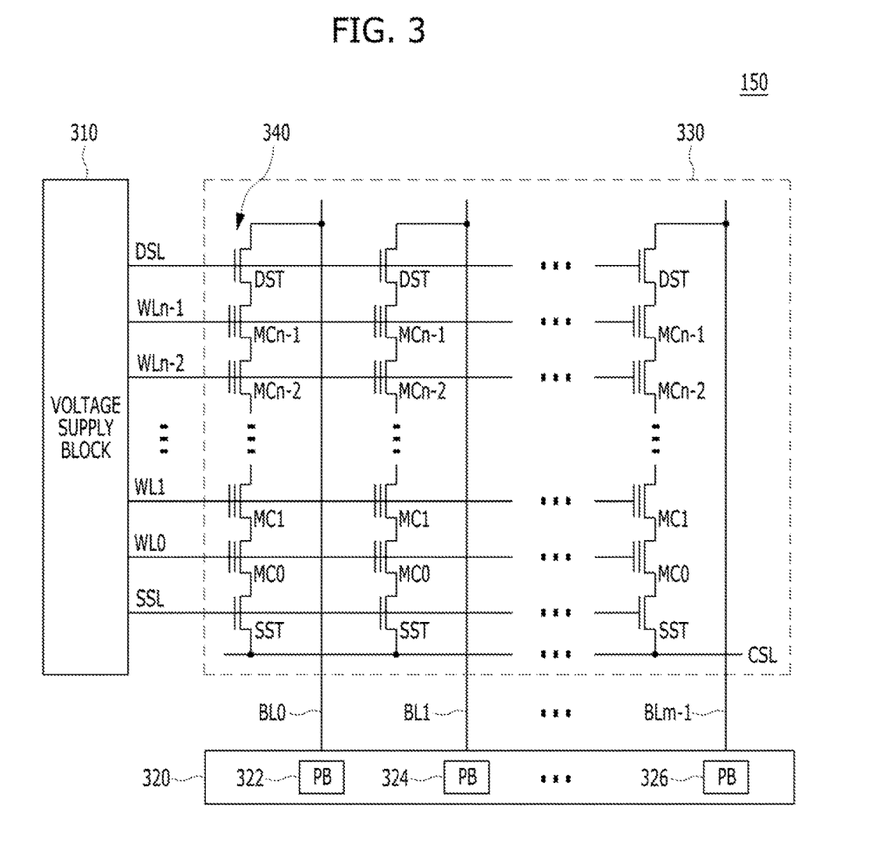
FIG. 3 is a circuit diagram illustrating an exemplary configuration of a memory cell array of a memory block in a memory device of FIG. 1.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and the source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3 the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
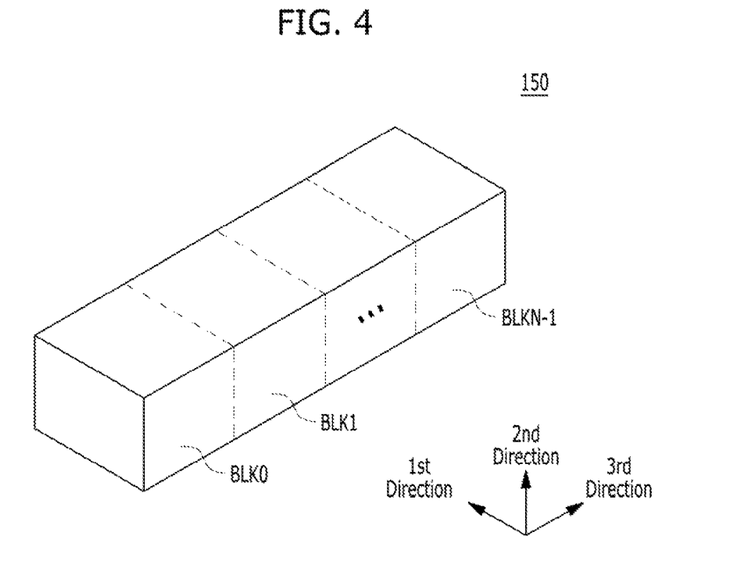
FIG. 4 is a schematic diagram illustrating an exemplary 3-D structure of the memory device of FIG. 1.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Figure 5:
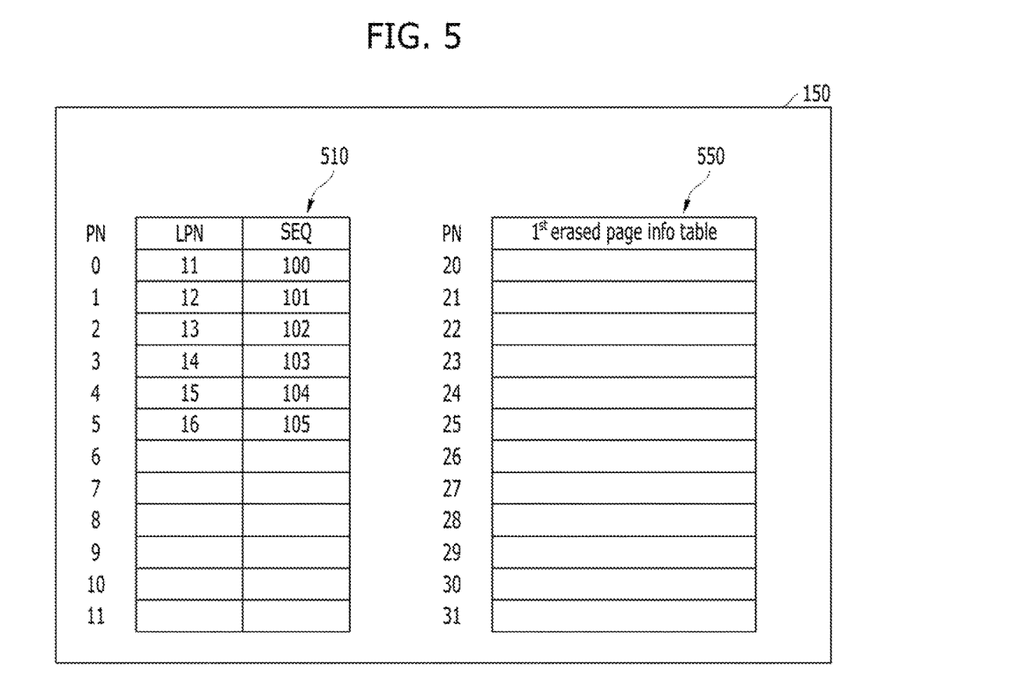
FIG. 5 is a schematic diagram illustrating a plurality of memory blocks of the memory device in the memory system in accordance with an embodiment of the present invention.

FIG. 5 is a schematic diagram illustrating a plurality of memory blocks 510 and 550 of the memory device 150 in the memory system 110 in accordance with an embodiment of the present invention.

Figure 6:
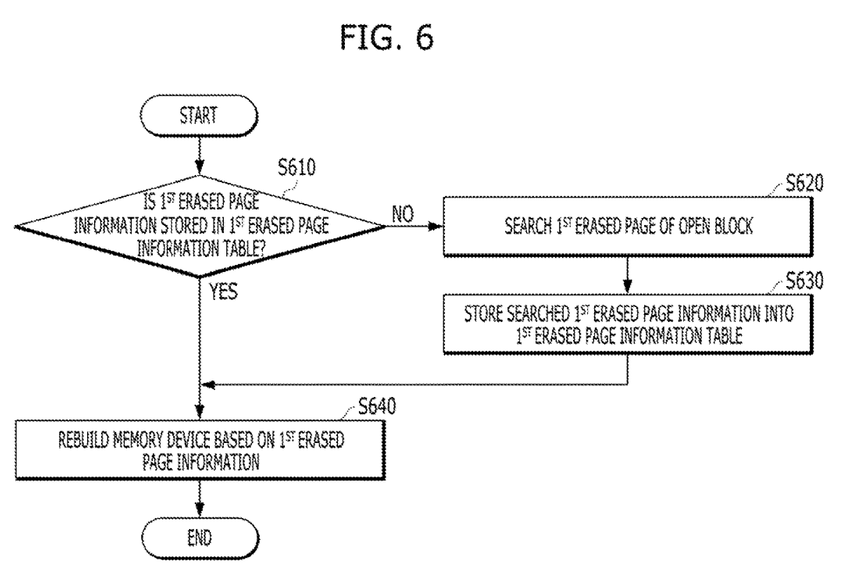
FIG. 6 is a flowchart illustrating a rebuild operation of the memory system in accordance with an embodiment of the present invention.

FIG. 6 is a flowchart illustrating a rebuild operation of the memory system 110 in accordance with an embodiment of the present invention.

Figure 7A:
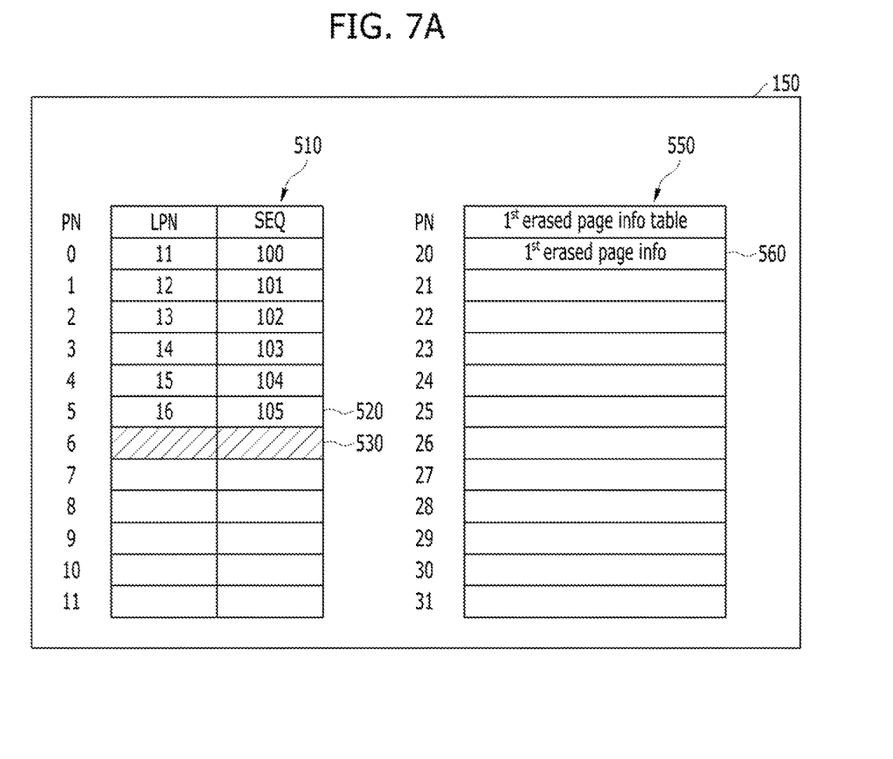
FIG. 7A is a schematic diagram illustrating a plurality of memory blocks according to a rebuild operation for a first SPO.

FIG. 7A is a schematic diagram illustrating a plurality of memory blocks 510 and 550 according to a rebuild operation for a first SPO.

Figure 7B:
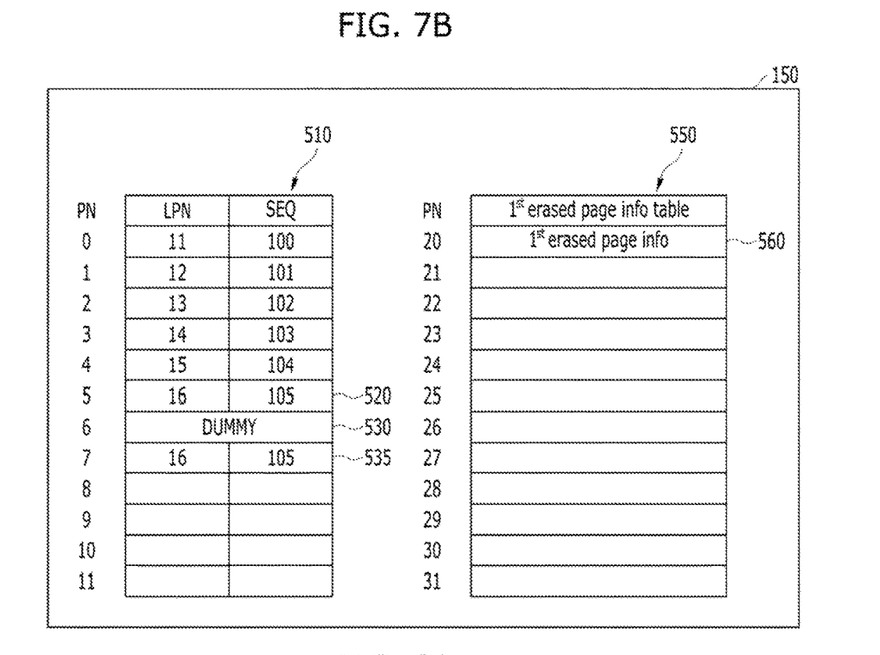
FIG. 7B is a schematic diagram illustrating a plurality of memory blocks according to a rebuild operation for a first SPO.

FIG. 7B is a schematic diagram illustrating a plurality of memory blocks 510 and 550 according to a rebuild operation for a first SPO.

Figure 8A:
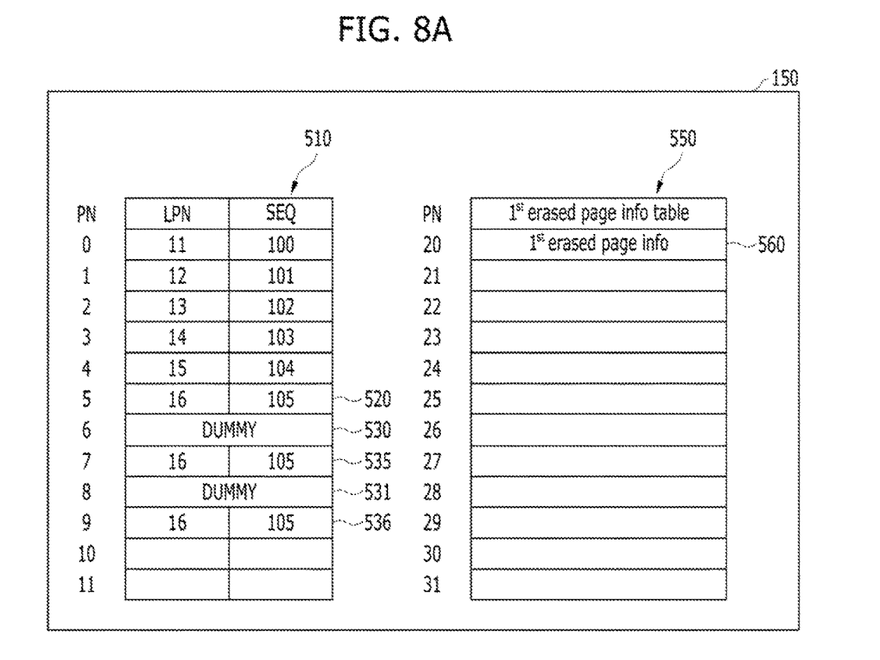
FIG. 8A is a schematic diagram illustrating a plurality of memory blocks according to a rebuild operation for a second SPO.

FIG. 8A is a schematic diagram illustrating a plurality of memory blocks 510 and 550 according to a rebuild operation for a second SPO.

Figure 8B:
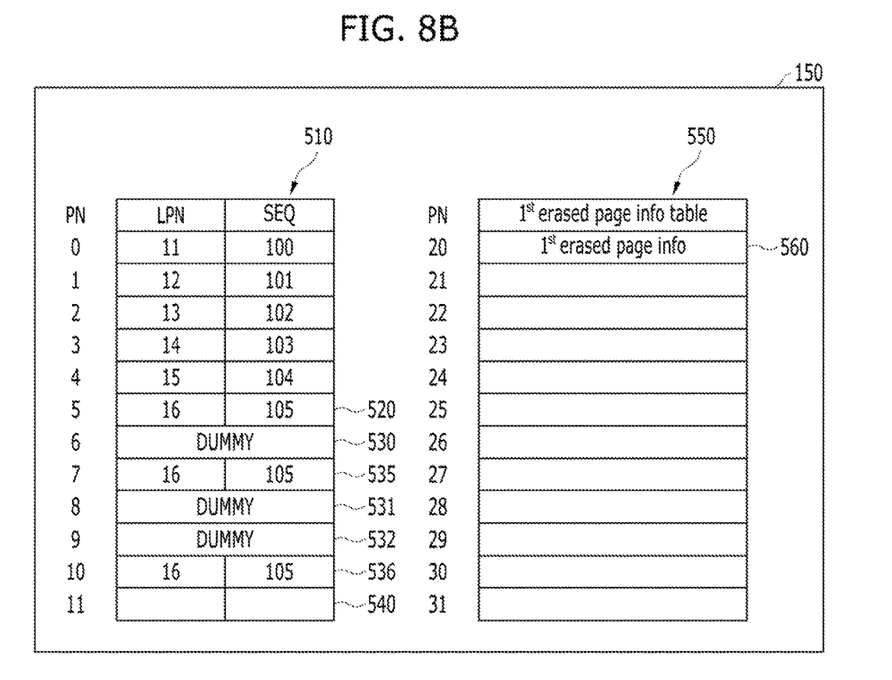
FIG. 8B is a schematic diagram illustrating a plurality of memory blocks according to a rebuild operation for a third SPO.

FIG. 8B is a schematic diagram illustrating a plurality of memory blocks 510 and 550 according to a rebuild operation for a third SPO.

Referring to FIG. 5, each of the plurality of memory blocks 510 and 550 may include a plurality of pages. Each of the plurality of pages may have a page number PN. User data and/or meta-data may be stored in the plurality of pages.

FIG. 5 illustrates that the memory block 510 may store user data and meta-data corresponding to a host command, and the memory block 550 may store meta-data for a rebuild operation after a sudden power off (SPO). For example, a $100^{th}$ user data SEQ 100 and a meta-data for the $100^{th}$ user data SEQ 100 may be stored in a $0^{th}$ page PN 0 of the memory block 510. The meta-data for the $100^{th}$ user data SEQ 100 may be a logical page number LPN 11 that is information of mapping relation between a page number and a logical address. In similar way, $101^{st}$ to $105^{th}$ user data SEQ 101 to SEQ 105 and meta-data for the $101^{st}$ to $105^{th}$ user data SEQ 101 to SEQ 105, that is, logical page numbers LPN 12 to LPN 16 may be stored in $1^{st}$ to $5^{th}$ pages PN 1 to PN5 of the memory block 510.

Referring to FIG. 5, the $6^{th}$ to $11^{th}$ pages of the memory block 510 may be erased pages, which are empty. Also, the memory block 550 may store a meta-data for a rebuild operation after a sudden power off, that is, a $1^{st}$ erased page information of the memory block 510.

A sudden power off SPO or a sudden power interruption may occur while the controller 130 is sequentially performing command operations from the $0^{th}$ page PN 0 to $m^{th}$ page of the memory block 510, which is an open block of the memory device 150, in response to a host command. The command operations of the controller 130 may be interrupted due to the sudden power off SPO. When the memory system 110 comes back to a power-on state after the sudden power off SPO, the controller 130 may perform a rebuild operation to the memory block 510, to which the command operations are being performed at the time of the sudden power off SPO, and then may resume the command operations. However, when a sudden power off SPO occurs again before the rebuild operation is completed and a rebuild operation is not performed to the memory block 510 again, reliability of data stored in the memory block 510 may not be guaranteed.

In accordance with an embodiment of the present invention, when a $1^{st}$ sudden power off SPO occurs while performing command operations, the $1^{st}$ erased page information of the memory block 510 may be secured. Therefore, a rebuild operation may be performed to guarantee reliability of data stored in the memory block 510, which is finally rebuilt, even if the sudden power off SPO occurs several times before the rebuild operation to the memory block 510 is completed, A $1^{st}$ erased page may be referred to as a page having a smallest page number among erased (i.e., empty) pages, in which user data or meta-data of the memory block 510 are not stored. For example, referring to FIG. 5, the $1^{st}$ erased page among $6^{th}$ to $11^{th}$ pages PN 6 to PN 11 may be the $6^{th}$ page PN 6.

When the memory system 110 comes back to the power-on state after a sudden power off SPO, the controller 130 may perform different rebuild operations to the memory block 510 according to whether a current rebuild operation is for a $1^{st}$ sudden power off SPO. In detail, when the controller 130 performs a rebuild operation for a $1^{st}$ sudden power off SPO, the controller 130 may load on the memory block 550 the $1^{st}$ erased page information of the memory block 510 and then may rebuild the memory block 510 based on the $1^{st}$ erased page information loaded on the memory block 550. When the controller 130 performs rebuild operations for $2^{nd}$ and subsequent sudden power offs SPOs, the controller 130 may rebuild the memory block 510 based on the $1^{st}$ erased page information, which is loaded on the memory block 550 during the rebuild operation for the $1^{st}$ sudden power off SPO.

The rebuild operations for the $1^{st}$ sudden power off SPO may be performed according to steps S610 to S640, which will be described with reference to FIG. 6. Rebuild operations for the $2^{nd}$ and subsequent sudden power offs SPOs may be performed according to steps S610 and S640 of FIG. 6.

The $1^{st}$ sudden power off SPO may be defined as a sudden power off, which occurs while the controller 130 is performing a command operation in response to a host command provided from a host while the $2^{nd}$ and subsequent sudden power offs SPOs may be defined as sudden power offs, which occur while the controller 130 is performing a rebuild operation. Hence, the $2^{nd}$ and subsequent sudden power offs SPOs occur after the $1^{st}$ erased page information is stored.

Referring to FIG. 6, when the memory system 110 comes back to the power-on state after a sudden power off SPO, the controller 130 may determine at step S610 whether the $1^{st}$ erased page information is stored in the memory block 550, which manages a $1^{st}$ erased page information table. In the $1^{st}$ erased page information table, the $1^{st}$ erased page information, that is, a meta-data of the $1^{st}$ erased page such as a page number, a word line and so forth of the $1^{st}$ erased page is stored.

As a result of step S610, when the $1^{st}$ erased page information is stored in the memory block 550 ("YES" at step S610), it may be regarded that a current rebuild operation corresponds to the $2^{nd}$ and subsequent sudden power offs SPOs and the controller 130 may perform step S640. As a result of step S610, when the $1^{st}$ erased page information is not stored in the memory block 550 ("NO" at step S610), it may be regarded that a current rebuild operation corresponds to the $1^{st}$ sudden power off SPO and the controller 130 may perform step S620.

For example, as illustrated in FIG. 5, when a $1^{st}$ sudden power off SPO occurs after the controller 130 stores $105^{th}$ user data SEQ 105 and meta-data LPN 16 into a $5^{th}$ page PN 5 in response to a program command provided from a host and then the memory system 110 comes back to the power-on state after the $1^{st}$ sudden power off SPO, the $1^{st}$ erased page information may be determined at step S610 not to be stored in the memory block 550 and thus the controller 130 may perform a rebuild operation for the $1^{st}$ sudden power off SPO. That is, the controller 130 may perform step S620.

However, for example, as illustrated in FIG. 8A, when the $1^{st}$ erased page information is stored in the memory block 550 during the rebuild operation for a $1^{st}$ sudden power off SPO, a $2^{nd}$ sudden power off SPO occurs before the rebuild operation for the $1^{st}$ sudden power off SPO is completed, and then the memory system 110 comes back to the power-on state after the $2^{nd}$ sudden power off SPO, the $1^{st}$ erased page information may be determined at step S610 to be stored the memory block 550 and thus the controller 130 may perform a rebuild operation for the $2^{nd}$ and subsequent sudden power offs SPOs. That is, the controller 130 may perform step S640.

Hereinafter, described in detail will be a rebuild operation for the $1^{st}$ sudden power off SPO.

When the $1^{st}$ erased page information is determined not to be stored in the memory block 550 at step S610, step S620 may be performed. That is as illustrated in FIG. 7A, when the $1^{st}$ erased page information is not stored in the memory block 550, the controller 130 may determine a current rebuild operation as for the $1^{st}$ sudden power off SPO and therefore may perform step S620.

At step S620, the controller 130 may search a $1^{st}$ erased page 530 of the memory block 550. In detail, the controller 130 may detect as the $1^{st}$ erased page 530 the page having the smallest page number among the erased (i.e., empty) pages, in which user data or meta-data of the memory block 510 are not stored, for example, through a binary search scheme. Referring to FIG. 7A, the $1^{st}$ erased page 530 of the memory block 510 may be the $6^{th}$ page PN 6 having the smallest page number among $6^{th}$ to $11^{th}$ pages PN 6 to PN 11, in which user data or meta-data of the memory block 510 are not stored.

At step S630, the controller 130 may store a $1^{st}$ erased page information 560 of the detected $1^{st}$ erased page 530, that is, a meta-data of the $1^{st}$ erased page 530 (i.e., the $6^{th}$ page PN 6) such as a page number, a word line and so forth of the $1^{st}$ erased page 530, into the $1^{st}$ erased page information table of the memory block 550.

At step S640, the controller 130 may rebuild the memory block 510 based on the $1^{st}$ erased page information stored in the $1^{st}$ erased page information table of the memory block 550. In detail, the controller 130 may rebuild the memory block 510 by programming dummy data into the $1^{st}$ erased page (i.e., the $6^{th}$ page PN 6 of FIG. 7A) and copying data stored in a last written page, which is previous page (i.e., the $5^{th}$ page PN 5 of FIG. 7A) of the $1^{st}$ erased page, into an erased page, which is a next page (i.e., the $7^{th}$ page PN 7 of FIG. 7A) of the $1^{st}$ erased page.

For example, as illustrated in FIG. 7B, the controller 130 may rebuild the memory block 510 by programming dummy data into the erased page 530 (i.e., the $6^{th}$ page PN 6 of FIG. 7B) of the memory block 550 and copying data stored in a last written page 520 (i.e., the $5^{th}$ page PN 5 of FIG. 7B), which is the previous page of the $1^{st}$ erased page 530, into an erased page 535 (i.e., the 7$^{th}$ page PN 7 of FIG. 7B), which is the next page of the 1$^{st}$ erased page 530.

Then, the controller 130 may resume the command operations, which are halted during the sudden power off SPO and corresponding rebuild operation. For example, the controller 130 may complete the program operation by sequentially storing user data and meta-data corresponding to the program command into an 8$^{th}$ page PN 8 and subsequent pages.

However, when a 2$^{nd}$ sudden power off SPO occurs after copying data stored in the last written page 520 (i.e., the 5$^{th}$ page PN 5 of FIG. 7B), which is the previous page of the 1$^{st}$ erased page 530 (i.e., the 6$^{th}$ page PN 6 of FIG. 7B), into the erased page 535 (i.e., the 7$^{th}$ page PN 7 of FIG. 7B), which is the next page of the 1$^{st}$ erased page 530 and before resuming the command operations, the controller 130 may perform a rebuild operation for the 2$^{nd}$ and subsequent sudden power offs SPOs. Hereinafter, described will be the rebuild operation for the 2$^{nd}$ and subsequent sudden power offs SPOs.

As briefly described above, the rebuild operation for the 2$^{nd}$ and subsequent sudden power offs SPOs means a rebuild operation for a sudden power off, which occurs after storing the 1$^{st}$ erased page information 560 into the memory block 550 and before completing the rebuild operation.

Referring to FIG. 6, when the 1$^{st}$ erased page information is determined as stored in the memory block 550 at step S610, step S640 may be performed. That is, as illustrated in FIG. 8A, when the 1$^{st}$ erased page information is stored in the memory block 550, the controller 130 may determine a current rebuild operation as for the 2$^{nd}$ and subsequent sudden power offs SPOs and therefore may perform step S640.

At step S640, the controller 130 may rebuild the memory block 510 based on the 1$^{st}$ erased page information stored in the 1$^{st}$ erased page information table of the memory block 550. In detail, as illustrated in FIG. 8A, the controller 130 may rebuild the memory block 510 by programming dummy data into an erased page 531 (i.e., the 8$^{th}$ page PN 8 of FIG. 8A), which is next erased page of the 1$^{st}$ erased page (i.e., the 6$^{th}$ page PN 6 of FIG. 8B as indicated by the 1$^{st}$ erased page information), and copying data stored in the last written page 520 (i.e., the 5$^{th}$ page PN 5 of FIG. 8A as identified from the 1$^{st}$ erased page information), which is previous page of the 1$^{st}$ erased page, into an erased page 536 (i.e., the 9$^{th}$ page PN 9 of FIG. 8A), which is next page of the erased page 531, into which the dummy data is programmed.

Then, the controller 130 may resume the command operations, which are halted during the sudden power off SPO and corresponding rebuild operation. For example, the controller 130 may complete the program operation by sequentially storing user data and meta-data corresponding to the program command into a 10$^{th}$ page PN 10 and subsequent pages.

However, as illustrated in FIG. 8B, when a 3$^{rd}$ sudden power off SPO occurs after programming the dummy data into the erased page 531 (i.e., the 8$^{th}$ page PN 8 of FIG. 8B) but before copying data stored in the last written page 520 (i.e., the 5$^{th}$ page PN 5 of FIG. 8B) into the erased page 532 (i.e., the 9$^{th}$ page PN 9 of FIG. 8B), which is the next page of the erased page 531, the controller 130 may perform a rebuild operation for the 2$^{nd}$ and subsequent sudden power offs SPOs.

Referring to FIG. 6, when the 1$^{st}$ erased page information is determined to be stored in the memory block 550 at step S610, step S640 may be performed. That is, as illustrated in FIG. 8B, when the 1$^{st}$ erased page information is stored in the memory block 550, the controller 130 may determine a current rebuild operation as for the 2$^{nd}$ and subsequent sudden power offs SPOs and therefore may perform step S640.

At step S640, the controller 130 may rebuild the memory block 510 based on the 1$^{st}$ erased page information stored in the 1$^{st}$ erased page information table of the memory block 550. In detail, as illustrated in FIG. 8B, the controller 130 may rebuild the memory block 510 by programming dummy data into the erased page 532 (i.e., the 9$^{th}$ page PN 9 of FIG. 8B), which is next erased page of the 1$^{st}$ erased page (i.e., the 6$^{th}$ page PN 6 of FIG. 8B as indicated by the 1$^{st}$ erased page information), and copying data stored in the last written page 520 (i.e., the 5$^{th}$ page PN 5 of FIG. 8B as identified from the 1$^{st}$ erased page information) into an erased page 536 (i.e., the 10$^{th}$ page PN 10 of FIG. 8B), which is next page of the erased page 532 (i.e., the 9$^{th}$ page PN 9 of FIG. 8B), into which the dummy data is programmed.

Then, the controller 130 may resume the command operations, which are halted during the sudden power off SPO and corresponding rebuild operation. For example, the controller 130 may complete the program operation by sequentially storing user data and meta-data corresponding to the program command into an 11$^{th}$ page PN 11 and subsequent pages.

As described above, in accordance with an embodiment of the present invention, in the memory system 110, the 1$^{st}$ erased page information 560 may be stored in the memory device 150 during the rebuild operation for the 1$^{st}$ sudden power off SPO so that damaged pages due to a sudden power off SPO may be precisely identified even when subsequent sudden power off SPO occurs several times. Therefore, data loss due to a sudden power off SPO may be minimized and reliability of data stored in the rebuilt memory block 510 may be secured by performing the rebuild operation to the damaged pages even when subsequent sudden power off SPO occurs several times.

In addition, even when a great amount of garbage data, for example, copy data of data stored in the last written page and/or dummy data are stored in the memory block 510 due to repetitive sudden power offs SPOs and corresponding rebuild operations, only required page region may be scanned on the basis of the 1$^{st}$ erased page information 560. For example, referring to FIG. 8B, during booting of the memory system 110, only 0$^{th}$ to 5$^{th}$ pages may be scanned on the basis of the 1$^{st}$ erased page information 560, which may not increase booting time of the memory system 110.

Even though the rebuild operation of the memory system 110 is described above to be performed on the basis of the 1$^{st}$ erased page information 560, the rebuild operation may be performed on the basis of a reference page information, for example, information of the last written page, which is other than the 1$^{st}$ erased page information.

FIGS. 9 to 14 are schematic diagrams illustrating application examples of the data processing system of FIG. 1.

Figure 9:
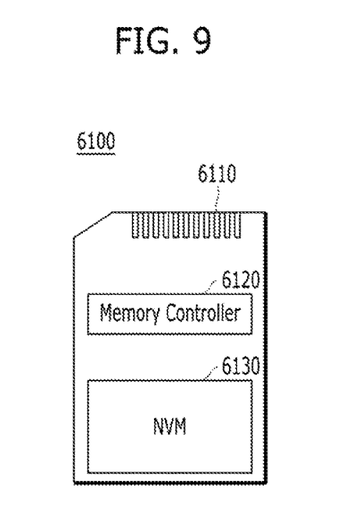
FIGS. 9 to 14 are schematic diagrams illustrating application examples of the data processing system of FIG. 1.

FIG. 9 is a diagram schematically illustrating another example of the data processing system including the memory system in accordance with the present embodiment. FIG. 9 schematically illustrates a memory card system to which the memory system in accordance with the present embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 8, and the memory device 6130 may correspond to the memory device 150 of the memory system 110 described with reference to FIGS. 1 to 8.

Thus, the memory controller 6120 may include a RAM, a processing unit, a host interface, a memory interface and an error correction unit. The memory controller 130 may further include the elements shown in FIG. 1 and perform the operations described in reference to FIGS. 1 to 8.

The memory controller 6120 may communicate with an external device for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. The memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
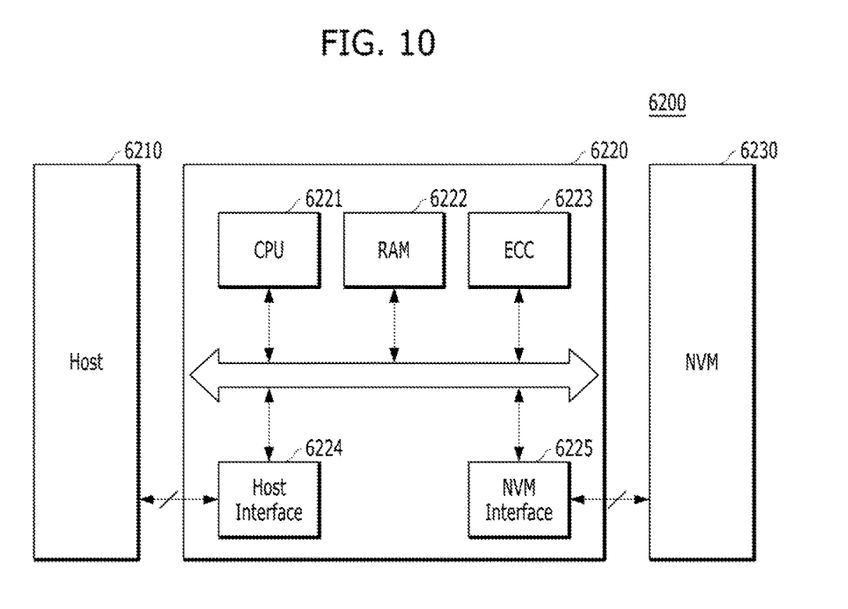

FIG. 10 is a diagram schematically illustrating another example of the data processing system including the memory system in accordance with the present embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 to 8, and the memory controller 6220 may correspond to the controller 130 in the memory system 110 illustrated in FIGS. 1 to 8.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
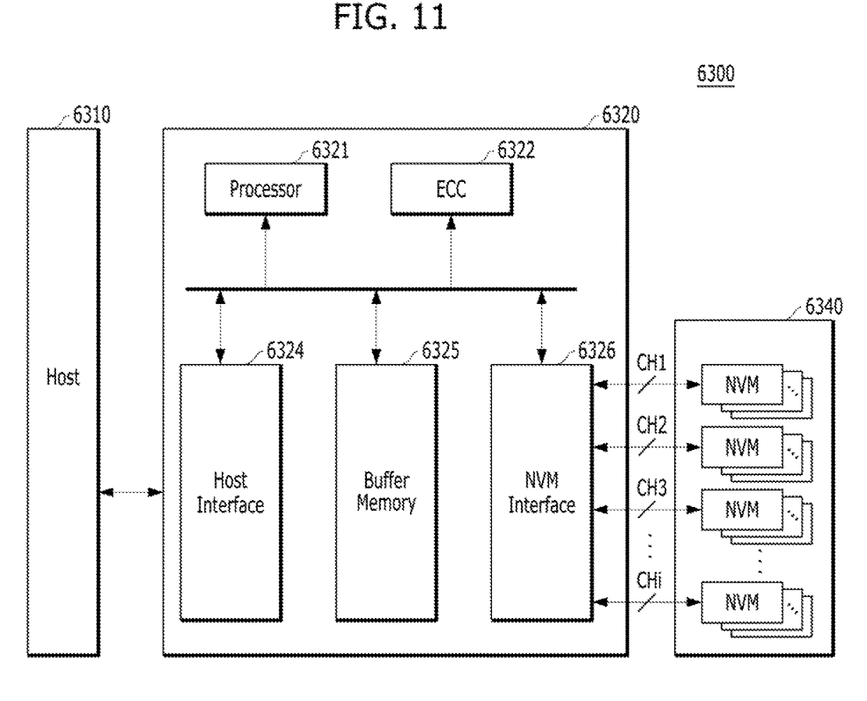

FIG. 11 is a diagram schematically illustrating another example of the data processing system including the memory system in accordance with the present embodiment. FIG. 11 schematically illustrates an SSD to which the memory system in accordance with the present embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIGS. 1 to 8, and the memory device 6340 may correspond to the memory device 150 in the memory system of FIGS. 1 to 8.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM ReRAM, STT-MRAM and PRAM. For convenience of description, FIG. 10 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 to 8 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
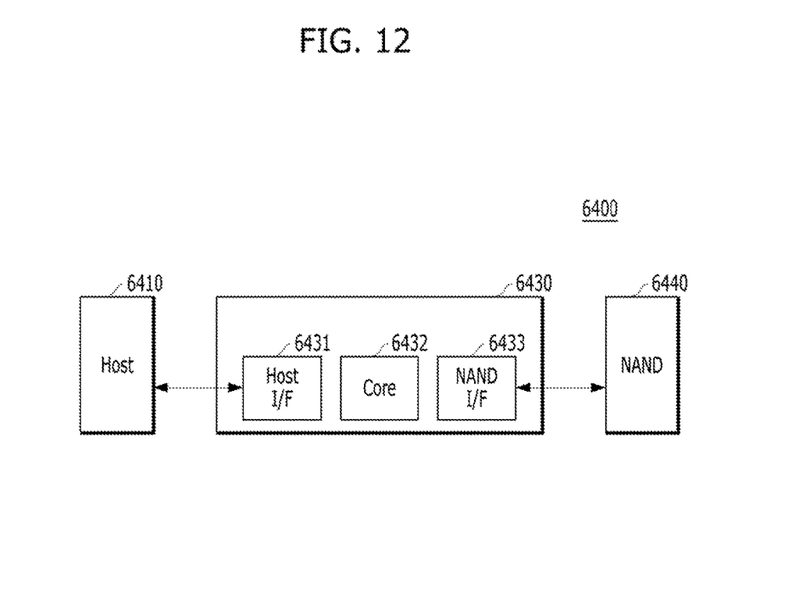

FIG. 12 is a diagram schematically illustrating another example of the data processing system including the memory system in accordance with the present embodiment. FIG. 12 schematically illustrates an embedded Multi-Media Card (eMMC) to which the memory system in accordance with the present embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 to 8, and the memory device 6440 may correspond to the memory device 150 in the memory system 110 of FIGS. 1 to 8.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, the host interface 132 as described with reference to FIG. 1. Furthermore, the host interface 6431 may serve as a serial interface, for example, an Ultra High Speed (UHS-I/UHS-II) interface.

Figure 13:
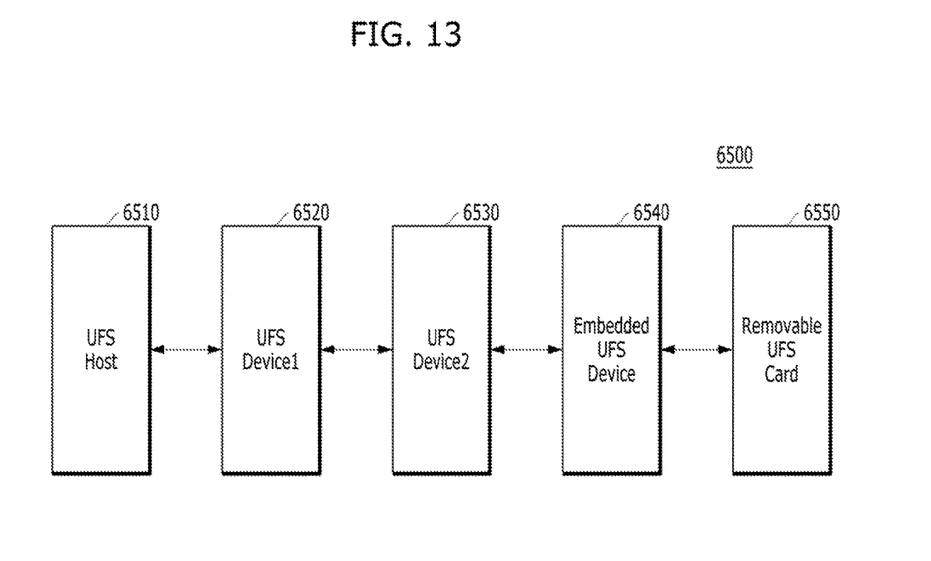

FIG. 13 is a diagram illustrating another example of a data processing system including a memory system according to an embodiment of the present invention. FIG. 13 is schematically illustrating a universal flash storage (UFS) to which the memory system according to an embodiment is applied.

Referring to FIG. 13, a UFS system 6500 may include a UFS host 6510, a plurality of UFS devices 6520 and 6530, an embedded UFS device 6540 and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. At least one of the UFS devices 6520 and 6530, the embedded UFS device 6540 and the removable UFS card 6550 may be implemented with the memory system 110 described above with reference to FIGS. 1 to 8. For example, at least one of the UFS devices 6520 and 6530, the embedded UFS device 6540 and the removable UFS card 6550 may be implemented as the memory card system 6100 described above with reference to FIG. 9. Preferably, all of the UFS devices 6520 and 6530, the embedded UFS device 6540 and the removable UFS card 6550 may be implemented with the memory system 110 described above with reference to FIGS. 1 to 8, such as for example, the memory card system 6100 described above with reference to FIG. 9. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro D.

Figure 14:
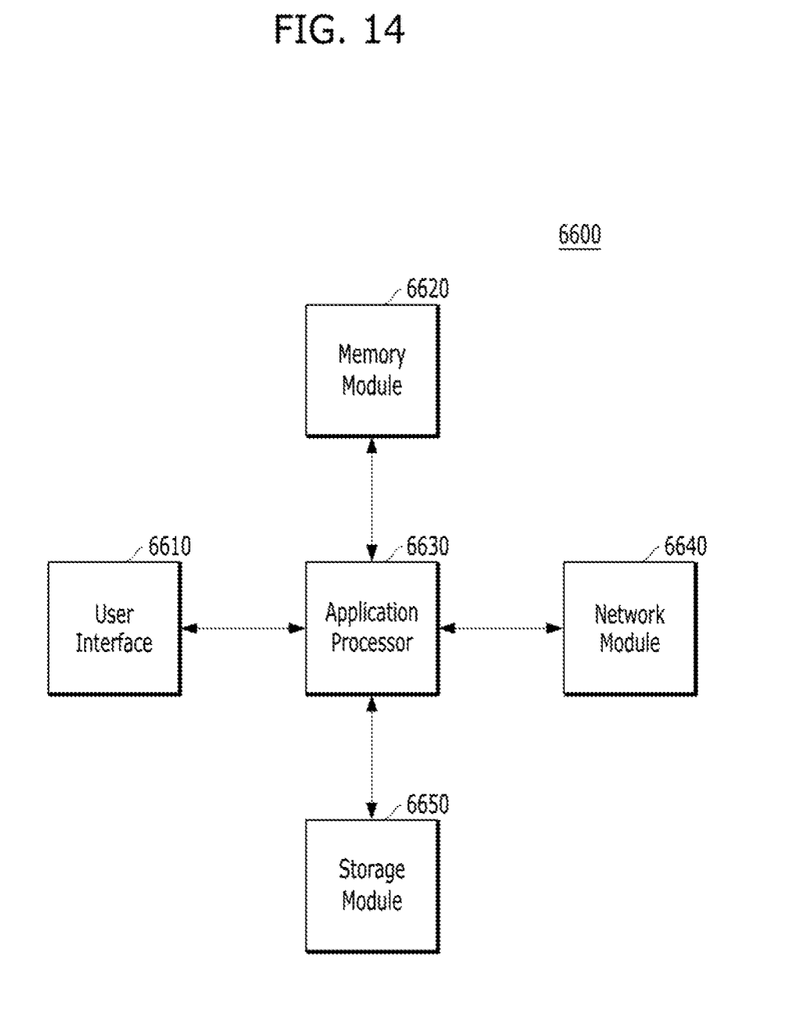

FIG. 14 is a diagram illustrating an example of a data processing system including the memory system according to an embodiment of the present invention. FIG. 14 is schematically illustrating a user system to which the memory system according to an embodiment is applied.

Referring to FIG. 14, a user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), and so on, and may thereby communicate with wired/wireless electronic appliances, for example, a mobile electronic appliance. Accordingly, the memory system and the data processing system may be applied to wired and or wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetic RAM (MRAM), a resistive RAM (ReRAM) a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIGS. 1 to 8, and may be implemented with the SSD, eMMC and UFS described above with reference to FIGS. 11 to 13.

The user interface 6610 may include one or more interfaces for inputting data, and/or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMO-LED) display device, a light emitting diode (LED), a speaker and a motor.

In the case where the memory system 110 described above with reference to FIGS. 1 to 8 is applied to the mobile electronic appliance of the user system 6600 according to an embodiment, the application processor 6630 may control the operations of the mobile electronic appliance, and the network module 6640 as a communication module may control wired/wireless communication with an external device, as described above. The user interface 6610 as the display/touch module of the mobile electronic appliance may display data processed by the application processor 6630 or support input of data from a touch panel.

The memory system and the operating method thereof according to various embodiments of the preset invention may minimize complexity and performance deterioration of the memory system and maximize use efficiency of a memory device thereby quickly and stably process data with respect to the memory device.

Although various embodiments have been described for illustrative purposes, it will be apparent to those skilled in the art that various other embodiments, changes and modifications thereof may be made without departing from the spirit and scope of the invention as defined in the following claims.

What is claimed is:

1. A method of operating a memory controller, the method comprising:
    searching a reference page information stored in a first memory block included in a memory device when a power is restored after occurrence of a sudden power off;
    when the reference page information is determined not to be stored in the first memory block as a result of the searching, identifying a reference page in a second memory block included in the memory device, and storing the reference page information of the identified reference page into the first memory block; and
    performing a first rebuild operation to data stored in the second memory block based on the reference page information stored in the first memory block,
    wherein the reference page is a $1^{st}$ erased page of the second memory block.

2. The method of claim 1, wherein the performing of the first rebuild operation includes:
    programming dummy data into the $1^{st}$ erased page in the second memory block; and
    copying data stored in a last written page previous to the $1^{st}$ erased page into a $1^{st}$ empty page next to the $1^{st}$ erased page.

3. The method of claim 1, wherein the identifying of the reference page is performed through a binary search.

4. The method of claim 1, wherein the reference page information includes address information of the $1^{st}$ erased page.

5. The operating method of claim 4, the address information includes a page number and a word line.

6. The operating method of claim 1, when the reference page information is determined to be stored in the result of the searching,
    performing the first rebuild operation to data stored in the second memory block based on the reference page information stored in the first memory block.

7. The operating method of claim 1, further comprising:
    searching, at the time of the sudden power off while performing the first rebuild operation, the reference page information stored in a first memory block when a power is restored after occurrence of the sudden power off; and
    performing a second rebuild operation to data stored in the second memory block based on the reference page information stored in the first memory block.

8. The operating method of claim 7, wherein the performing of the second rebuild operation includes:
- programming dummy data into a 1st empty page next to the 1st erase page in the second memory block; and
- copying data stored in a last written page previous to the 1st erased page into a 2nd empty page next to the 1st empty page.

9. A memory system comprising:
- a memory device including a first memory block for storing a reference page information and a second memory block for storing data; and
- a controller suitable for performing a first rebuild operation to data stored in the memory device, wherein the controller:
- searches the reference page information stored in the first memory block when a power is restored after occurrence of a sudden power off;
- when the reference page information is determined not to be stored in the first memory block as a result of the searching, identifies a reference page in the second memory block, and stores the reference page information of the identified reference page into the first memory block; and
- performs the first rebuild operation to data stored in the second memory block based on the reference page information stored in the first memory block, wherein the reference page is a $1^{st}$ erased page of the second memory block.

10. The memory system of claim 9, wherein the controller performs the first rebuild operation by:
- programming dummy data into the $1^{st}$ erased page in the second memory block; and
- copying data stored in a last written page previous to the $1^{st}$ erased page into a $1^{st}$ empty page next to the $1^{st}$ erased page.

11. The memory system of claim 9, wherein the controller identifies the reference page of the second memory block through a binary search.

12. The memory system of claim 9, wherein the reference page information includes address information of the 1st erased page.

13. The memory system of claim 12, the address information includes a page number and a word line.

14. The memory system of claim 9, when the reference page information is determined to be stored in the result of the searching,
- wherein the controller performs the first rebuild operation to data stored in the second memory block based on the reference page information stored in the first memory block.

15. The memory system of claim 9,
- wherein the controller searches, at the time of the sudden power off while performing the first rebuild operation, the reference page information stored in a first memory block when a power is restored after occurrence of the sudden power off; and performs a second rebuild operation to data stored in the second memory block based on the reference page information stored in the first memory block.

16. The memory system of claim 15,
- wherein the controller programs dummy data into a 1st empty page next to the 1st erase page in the second memory block; and copies data stored in a last written page previous to the 1st erased page into a 2nd empty page next to the 1st empty page.

* * * * *